(12) United States Patent
Kerscher

(10) Patent No.: US 9,956,919 B2
(45) Date of Patent: May 1, 2018

(54) FASTENING ASSEMBLY FOR A ROOF ADD-ON PART OF A MOTOR VEHICLE

(71) Applicant: Bayerische Motoren Werke Aktiengesellschaft, Munich (DE)

(72) Inventor: Martin Kerscher, Dornwang (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days. days.

(21) Appl. No.: 15/247,980

(22) Filed: Aug. 26, 2016

(65) Prior Publication Data
US 2016/0362054 A1 Dec. 15, 2016

Related U.S. Application Data

(63) Continuation of application No. PCT/EP2015/053535, filed on Feb. 19, 2015.

(30) Foreign Application Priority Data

Feb. 27, 2014 (DE) .................. 10 2014 203 558

(51) Int. Cl.
| B62D 27/02 | (2006.01) |
| B60R 9/04  | (2006.01) |
| B62D 25/06 | (2006.01) |

(52) U.S. Cl.
CPC ............. B60R 9/04 (2013.01); B62D 25/06 (2013.01); B62D 27/023 (2013.01)

(58) Field of Classification Search
CPC .......... B60R 9/04; B62D 25/06; B62D 27/023
(Continued)

(56) References Cited

U.S. PATENT DOCUMENTS

| 5,540,478 A * | 7/1996 | Schuch ............... B60J 7/04 |
| | | 224/331 |
| 7,775,586 B2 * | 8/2010 | Hallik ............... B62D 25/06 |
| | | 296/193.04 |

(Continued)

FOREIGN PATENT DOCUMENTS

| CN | 2519042 Y   | 10/2002 |
| CN | 101379305 A | 3/2009  |

(Continued)

OTHER PUBLICATIONS

International Search Report (PCT/ISA/210) issued in PCT Application No. PCT/EP2015/053535 dated May 21, 2015 with English translation (five pages).

(Continued)

*Primary Examiner* — Jason S Morrow
*Assistant Examiner* — E Turner Hicks
(74) *Attorney, Agent, or Firm* — Crowell & Moring LLP

(57) ABSTRACT

A fastening assembly is provided for a roof add-on part of a motor vehicle, which has a roof skin element, an outer roof side frame, and a roof-add-on-part fastening element, which has a thread for detachably fastening the roof add-on part. The roof-add-on-part fastening element is fastened to a support plate. The support plate is arranged on a flange of the outer roof side frame and is fixed by a blind rivet only to the flange of the outer roof side frame, in such a way that the support plate and the flange of the outer roof side frame are jammed, in particular against each other.

14 Claims, 2 Drawing Sheets

(58) Field of Classification Search
USPC .............................. 296/193.12, 29, 30, 210
See application file for complete search history.

(56) References Cited

U.S. PATENT DOCUMENTS

| | | | |
|---|---|---|---|
| 2003/0077118 A1 | 4/2003 | Kobusch et al. | |
| 2005/0158138 A1* | 7/2005 | Schneider | F16B 37/067 411/43 |
| 2008/0099519 A1* | 5/2008 | Binder | B60R 9/04 224/309 |
| 2011/0057482 A1* | 3/2011 | Mathes | B62D 25/06 296/210 |
| 2014/0353350 A1 | 12/2014 | Sirrenberg et al. | |

FOREIGN PATENT DOCUMENTS

| | | |
|---|---|---|
| DE | 103 37 202 A1 | 3/2005 |
| DE | 103 49 704 A1 | 6/2005 |
| DE | 10 2004 026 773 A1 | 12/2005 |
| DE | 10 2005 044 283 A1 | 4/2007 |
| DE | 10 2006 007 707 A1 | 8/2007 |
| DE | 10 2006 032 006 A1 | 1/2008 |
| DE | 20 2012 000 436 U1 | 2/2012 |
| DE | 10 2012 009 009 A1 | 12/2012 |
| EP | 1 304 489 A2 | 4/2003 |
| JP | 2006-219064 A | 8/2006 |

OTHER PUBLICATIONS

German-language Written Opinion (PCT/ISA/237) ) issued in PCT Application No. PCT/EP2015/053535 dated May 21, 2015 (five pages).

German Search Report issued in counterpart German Application No. 10 2014 203 558.9 dated Jan. 16, 2015 with partial English translation (10 pages).

Chinese Office Action issued in counterpart Chinese Application No. 201580010627.8 dated May 2, 2017 with English-language translation (thirteen (13) pages).

\* cited by examiner

FASTENING ASSEMBLY FOR A ROOF ADD-ON PART OF A MOTOR VEHICLE

CROSS REFERENCE TO RELATED APPLICATIONS

This application is a continuation of PCT International Application No. PCT/EP2015/053535, filed Feb. 19, 2015, which claims priority under 35 U.S.C. § 119 from German Patent Application No. 10 2014 203 558.9, filed Feb. 27, 2014, the entire disclosures of which are herein expressly incorporated by reference.

BACKGROUND AND SUMMARY OF THE INVENTION

The present invention relates to a fastening assembly for a roof add-on part of a motor vehicle, wherein the fastening assembly has an outer roof skin element, an outer roof side frame and a roof add-on part fastening element, which has a thread for detachably fastening the roof add-on part.

From DE 102004026773 A1, for example, a fastening means for a roof carrier of a motor vehicle is known. Here, the fastening means is developed at the bottom of a roof gutter that is formed by an outer roof frame body panel and a vehicle roof. A support plate has a projection with an inner thread to which the roof carrier or the like can be fastened. The support plate is, in t connected to the bottom of the roof gutter via a plurality of blind rivets. In particular, the respective blind rivet penetrates a flange of the vehicle roof, as well as the flanges of three body panels of the roof side frame. Fastening openings for fastening the support plate at the bottom of the roof gutter are developed afterwards in the roof gutter. To fasten the support plate, the support plate is positioned with through-openings that align with the fastening openings, the blind rivet is introduced into the respective fastening opening, and in this way, the support plate is fixed at the roof of the vehicle by jamming the flanges of the body panels against each other.

The object of the present invention is to provide a fastening assembly for a roof add-on part of a motor vehicle comprising an outer roof skin element, an outer roof side frame and a roof add-on part fastening element with a thread for detachably fastening the roof add-on part, wherein a production of the fastening assembly is simplified.

This and other objects of the invention are achieved by a fastening assembly for a roof add-on part of a motor vehicle having an outer roof skin element, an outer roof side frame and a roof add-on part fastening element having a thread for detachably fastening the roof add-on part. The roof add-on part fastening element is fastened to a support plate. The support plate is arranged at a flange of the outer roof side frame and is fixed by a blind rivet only at the flange of the outer roof side frame—in particularly jamming the support plate and the flange of the outer roof side frame against each other.

In this way, the roof add-on part fastening element is connected only to the flange of the outer side frame. In particular, the blind rivet only connects e support plate to the flange of the outer roof side frame so that no other aligning through-boring is required in other body panel elements. In this way, a through-boring for the blind rivet can be introduced into the outer roof side frame already even before the outer roof side frame is assembled with the motor vehicle body and, therefore, in particular already before any painting process, without having to take into account production tolerances of other body panel parts and joint tolerances of said body panel parts. A position of the roof add-on part fastening element is therefore determined by the through-boring.

The support plate is in particular developed in a locally limited fashion, which is to say, it reaches only over a locally limited part of the flange of the outer roof side frame. Thus, the width of the support plate preferably corresponds approximately to a width of the flange of the outer roof side frame. The support plate can also be developed a bit wider or a bit less wide than the flange of the outer roof side frame. The support plate can extend in longitudinal direction of the flange over an area that is shorter than a one-digit multiple of the width of the flange.

The blind rivet preferably connects the support plate and the flange by jamming the same against each other.

The roof add-on part, for example, can be a roof carrier for transporting loads and luggage or athletic equipment. In particular, the roof add-on part can be a conventional roof carrier for a passenger motor vehicle.

At least or more roof add-on part fastening elements with a respective associated support plate can be provided at a right outer roof side fame, and correspondingly, two or more roof add-on part fastening elements with a respective associated support plate can be provided at a left outer roof side frame. Preferably, four fastening assemblies are thus provided for the roof add-on part, so that the roof add-on part is connectable to the motor vehicle at at least four points that are spaced apart from each other.

The outer roof side frame and the outer roof skin element preferably form at their interface a groove that runs in longitudinal direction of the vehicle and is also called a gutter.

According to a preferred modification, the roof add-on part fastening element is developed by the blind rivet. In this way, the blind rivet forms a fastener of the support plate at the outer roof side frame as well as a fastening element for the roof add-on part.

According to another preferred modification, the flange of the outer roof side frame has a flange through-boring, and the support plate has a support plate through-boring, with the flange through-boring and the support plate through-boring being in alignment and developed to guide the blind rivet through.

Because the support plate is a locally limited element developed independently of vehicle body elements and has only a supporting function, the support plate through-boring can be arranged particularly easily to align with the flange through-boring. No subsequent boring is required to realize aligning through-borings with narrow tolerances, and the blind rivet can be guided easily through the flange through-boring and the support plate through-boring so that it can connect the flange of the outer roof side frame and the support plate by jamming the same easily into each other.

According to a preferred modification, the support plate is arranged at an inner side of the flange of the outer roof side frame. In particular, the inner side of the flange of the roof side frame is a side that is opposite to an outer side of the car body.

Because of this, the support plate is barely or not at all visible from the outside.

Advantageously, the outer roof skin element of the fastening assembly according to the present invention has a roof flange. The roof flange is connected to the flange of the outer roof side frame. Furthermore, in the area of the blind rivet, the roof flange advantageously has a cutout that is sufficiently larger than the head of the blind rivet.

In this way, the outer roof skin element is connected to the outer roof side frame in a conventional manner, whereas the outer roof skin element does not overlap with the blind rivet because of the cutout in the roof flange. In this way, the blind rivet does not form a positive or non-positive connection between the outer roof skin element and the outer roof side frame.

The cutout can be developed sufficiently large to compensate for production tolerances of the outer roof skin element, wherein the outer roof skin element does not overlap with the blind rivet.

According to a preferred modification, the outer roof skin element is made of a different material than the roof side frame. In particular, the material of the outer roof skin element has a different thermal expansion coefficient than the material of the outer roof side frame. For example, the outer roof skin element can be developed of a light metallic material, in particular an aluminum material or fiber plastic composite material. The outer roof side frame can be developed of a steel material.

Different materials with different thermal expansion coefficients normally lead to problems at the connecting points, wherein with the present invention, there is advantageously no connection between the elements with the various materials and various thermal expansion coefficients, at least not via the roof add-on part fastening element. By selecting a sufficient size of the cutout of the roof flange in the area of the blind rivet, an overlapping of the roof flange and the blind rivet can be avoided over a large temperature range to which motor vehicles may be subjected.

Preferably, the roof flange is joined to the flange of the outer roof side frame by gluing. Is way, the outer roof skin element is glued to the roof side frame.

According to a preferred modification of the fastening assembly, the outer roof side frame and an inner roof side frame together form a roof side frame hollow profile. Thus, a flange of the inner roof side frame is connected to the flange of the outer roof side frame. Preferably, the flange of the inner roof side frame has a cutout in the area of the blind rivet, which is at least larger than a blind rivet bead.

In this way, the flange of the outer roof side frame is principally connected to the flange of the inner roof side frame, but the blind rivet only connects the support plate and the flange of the outer roof side frame. For the blind rivet, in particular the head of the blind rivet, not to overlap with the flange of the inner roof side frame in an assembling of the blind rivet, the flange of the inner roof side frame has the cutout in the area of the blind rivet.

According to further advantageous modification of the fastening assembly according to the present invention, the support plate is arranged between the flange of the outer roof side frame and the flange of the inner roof side frame.

Thus, the support plate can be fixed between the flange of the outer roof side frame and the flange of the inner roof side frame.

The fastening assembly with the outer roof side frame and the inner roof side frame can furthermore have a roof side frame reinforcement that is arranged between the outer roof side frame and the inner roof side frame. Thus, a flange of the roof side frame reinforcement is arranged between the flange of the outer roof side frame and the flange of the inner roof side frame and connected to the flange of the outer roof side frame and the flange of the inner roof side frame. The support plate is arranged between the flange of the outer roof side frame and the flange of the roof side frame reinforcement and the flange of the roof side frame reinforcement can have a cutout that is developed at least sufficiently larger than the blind rivet and/or a blind rivet bead.

In this way, the flange of the roof side frame reinforcement also does not overlap with the blind rivet bead and/or the blind rivet connection.

According to a preferred modification, the support plate is additionally connected in a firm bond to the flange of the outer roof side frame, for example by gluing or welding. Furthermore, the support plate can be additionally connected in a firm bond to the flange of the inner roof side frame and/or the flange of the roof side frame reinforcement, if there is one, for example by gluing or welding.

In this way, the overall fastening assembly is very stable.

According to an especially preferred modification, the blind rivet is developed as a blind rivet nut.

This facilitates an especially easy assembling with few components, wherein an internal thread of the blind rivet nut simultaneously can be the thread for connecting the roof add-on part by use of a screw element.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, an exemplary embodiment of the present invention is described in detail with reference to the FIGS. 1 to 3.

Figure 1:
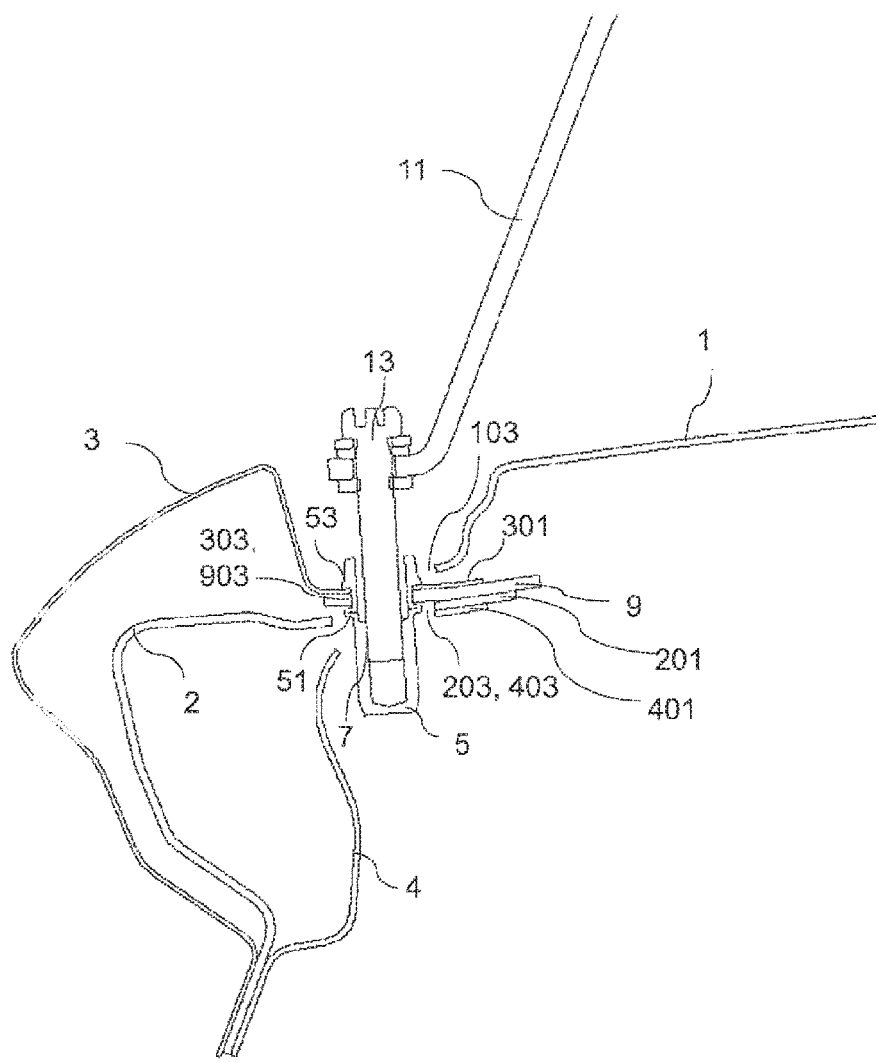
FIG. 1 is a schematic sectional view along a transverse direction of a vehicle and a vertical direction of a vehicle of a fastening assembly for a roof add-on part of a motor vehicle according to an exemplary embodiment of the present invention.

As shown in the schematic sectional view in FIG. 1, a fastening assembly for a roof add-on part 11, which can be a roof carrier, for example, of a motor vehicle according to present invention has a roof side frame comprised of an outer roof side frame 3, an inner roof side frame 4, and a roof side frame reinforcement 2 arranged in between. The roof side frame 2, 3, 4 forms a hollow profile. The roof side frame is a roof side frame of a conventional passenger motor vehicle with a solid roof. The passenger motor vehicle can be developed as a limousine, a sedan or a hatchback.

The motor vehicle has a left and a right roof side frame, between which a plate-shaped outer roof skin element 1 is arranged. The outer roof side frame 3, the inner roof side frame 4 and the roof side frame reinforcement 2 arranged in between are connected to each other at associated flanges 301, 401 and 201 as shown in FIG. 2. Furthermore, the outer roof skin element 1 is connected to the flange 301 of the outer roof side frame 3 via a roof flange 101, which is shown in FIG. 2. In particular, a bonding agent layer is developed in a gap 15 between the flange 301 of the outer roof side frame 3 and the roof flange 101 of the outer roof skin element 1 so that the outer roof skin element 1 is bonded to the outer roof side frame 3. In the area of the flange 301 of the outer roof side frame 3 and the roof flange 101, in other words, in an area where the roof side frame 3 and the outer roof skin element 1 adjoin, a rain gutter of the motor vehicle is developed, which runs essentially in the longitudinal direction, which is to say in the X-direction of the motor vehicle.

Figure 3:
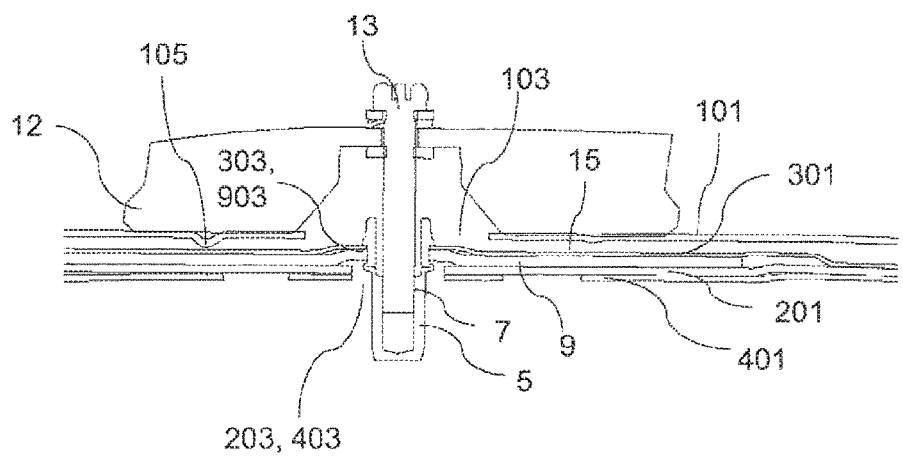
FIG. 3 is a schematic sectional view along a longitudinal direction of a vehicle and the vertical direction the vehicle of the fastening assembly for the roof add-on part of the motor vehicle according to the exemplary embodiment of the present invention.

The roof add-on part 11 has a foot 12, which is shown in FIG. 3. The foot 12 of the roof add-on part 11 is supported at the rain gutter of the motor vehicle, in particular at the roof flange 101.

The figures only show the left roof side frame of the motor vehicle schematically. The right roof side frame is developed analogously and is not described here in greater detail so as to avoid repetition.

Furthermore, FIG. 1 shows a roof and-on part fastening element 5 developed as blind rivet nut, which is arranged in the rain gutter of the motor vehicle. The blind rivet nut 5 has an inside thread 7, into which a screw 13 is screwed or can be screwed to fasten the roof add-on part 11. The blind rivet nut 5 is inserted into the flange 301 of the outer roof side frame 3 from the top through a corresponding, previously developed through-boring 303 and further more penetrates a through-boring 903 of a support plate 9, which aligns with the through-boring 301; said support plate is arranged below the flange 301 of the outer roof side frame 3 and adjoins the same. The blind rivet nut 5 is attached exclusively at these two elements, which is to say the flange 301 and the support plate 9, and connects these two elements in a jamming (clamping) fashion. A bead 51 of the blind rivet nut 5 engages with an underside of the support plate 9. A collar 53 of the blind rivet nut 5 engages with the upper side of the flange 301. The bead 51 of the blind rivet nut 5 is developed by deformation when the blind rivet nut 5 is assembled from the top. Thus, the support plate 9 provides the relatively thin flange 301 of the outer roof side frame 3 with stability for a sufficiently firm and stable connection of the blind rivet nut 5 as the roof add-on part fastening element. In the area of the blind rivet nut 5, the outer roof skin element 1 has a sufficiently large cutout 103 so that the outer roof skin element 1 does not overlap with the blind rivet nut 5, in particular the collar 53 of the blind rivet nut 5. The cutout 103 of the roof flange 101 is selected large enough so that the outer roof skin element 1 and the roof side frame 3 are not subjected to narrow production tolerances and/or joint tolerances relative to one another.

At the underside of the blind rivet nut 5, the flange 201 of the roof side frame reinforcement 2 has a cutout 203 that is selected sufficiently large no as not to overlap with the bead 51 of the blind rivet nut 5 at the underside of the support plate 9. Likewise, the flange 401 of the inner roof side frame 4 has a sufficiently large cutout 403 so that it also does not overlap with the bead 51 of the blind rivet nut 5. Thus, the cutouts 203 and 403 are not subject to any narrow tolerances and can be developed sufficiently larger than the bead 51 of the blind rivet nut 5. Therefore, the cutouts 203 and 403 can be simply developed in the unfinished roof side frame reinforcement 2 and inner roof side frame 4 body panels before said unfinished body panels are joined and undergo a painting process.

Likewise, the cutout 103 of the roof flange 101 can also be simply developed prior to assembly of the outer roof skin element 1 and, if applicable, prior to a painting process of the outer roof skin element 1.

Likewise, the through-opening 303 of the flange 301 of the outer roof side frame 3 can be simply developed earlier, which is to say prior to assembly of the outer roof side frame 3, because the position of the through-boring 303 is not dependent on any other body panel, such as the outer roof skin element 1, the roof side frame reinforcement 2 and the inner roof side frame 4, and the position of the roof add-on part fastening element in form of the blind rivet nut 5 is defined and/or determined merely with reference to the outer roof side frame 3. The support plate 9, which is an element limited in size, can in turn simply be arranged at the flange 301 of the outer roof side frame 3 to align with the through-boring 303.

Therefore, according to the present invention, an attachment of a roof add-on part fastening element at the outer roof skin element and/or the roof side frame reinforcement and/or the inner roof side frame is not necessary compared to previously known solutions and therefore, no through-boring is required afterwards in order to obtain ling through-borings.

Figure 2:
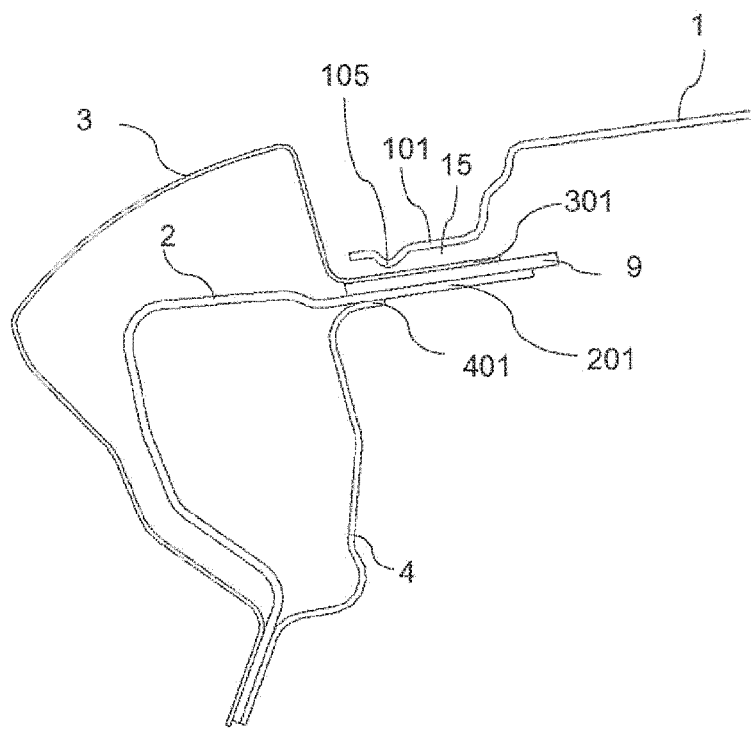
FIG. 2 is a further schematic sectional view along the transverse direction of the vehicle and the vertical direction of the vehicle of a fastening assembly for the roof add-on part of the motor vehicle according to the exemplary embodiment of the present invention.

Whereas in FIG. 1, the section running in a y-z plane runs through the blind rivet nut 5, in FIG. 2, the schematic section shown is developed in a y-z plane adjacent to the blind rivet nut 5. As can be FIG. 2, the support plate 9 is in contact with the underside of the flange 301 of the outer roof side frame 3. The flange 201 of the roof side frame reinforcement 2, in turn, is in contact with the underside of the support plate 9. Furthermore, the flange 401 is shown, which is in contact with an underside of the flange 201 of the roof side frame reinforcement 2. Thus, the flanges 301, 201 and 401 are interconnected in a suitable manner. Thus, the connection can be made by firmly bonding, for example by welding or gluing. It is also possible that in particular the support plate 9 is glued to the flanges 301 and 201, whereas outside of the support plate 9, the flanges 301 and 201 are welded to one another.

Furthermore, FIG. 2 shows that the roof flange 101 has a projection 105 that projects from the roof flange 101 in the direction of the flange 301 and contacts the flange 301. The roof flange 101 can have a plurality of such projections 105 and its purpose is to ensure a distance, which is to say the gap 15, between the roof flange 101 and the flange 301 so that the bonding agent cannot flow in the gap 15 between the roof flange 101 and the flange 301 under load, in particular by the foot 1 of the roof add-on part 11, which rests on and is supported by the roof flange 101, as shown in FIG. 3, because the projections 105 are supported at the flange 301 of the outer roof side frame 3.

FIG. 3 shows a schematic longitudinal section, which is to say a section along an x-z direction, through the blind rivet nut 5 and adjacent areas of the rain gutter. As shown in FIG. 3, the support plate 9 thus runs in the longitudinal direction over a locally limited part of the rain gutter. As also shown in FIG. 3, the cutout 103 of the flange 101, the cutout 203 of the flange 201, and the cutout 403 of the flange 401, are selected sufficiently large so that taking into consideration all production tolerances and joint tolerances of the unfinished body panels 1, 2 and 4, they do not overlap with the blind rivet nut 5 and the bead 51 thereof.

According to the invention, the blind rivet nut 5 is therefore fastened exclusively at the flange 301 of the outer roof side frame 3 and the support plate 9, with the blind rivet nut 5 connecting the flange 301 of the outer roof side frame 3 and the support plate 9 by jamming (clamping) them against each other. To that end, the flange 301 and the support plate 9 have corresponding aligning through-borings 303 and 903. Furthermore, the blind rivet nut 5 forms a connection between the flange 301 and the support plate 9, as well as an inner thread for connecting the roof add-on part 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening assembly for a roof add-on part of a motor vehicle, comprising:
    an outer roof skin element;
    an outer roof side frame;
    a roof add-on part fastening element having a thread for detachably fastening the roof add-on part, wherein
    the roof add-on part fastening element is fastened to a support plate arranged on a flange of the outer roof side frame, and
    the support plate is fixed via a blind rivet only on the flange of the outer roof side frame.

2. The fastening assembly according to claim 1, wherein the roof add-on part fastening element is constructed of the blind rivet.

3. The fastening assembly according to claim 1, wherein:
    the flange of the outer roof side frame has a flange through-boring and the support plate has a support plate through-boring, and
    the flange through-boring and the support plate through-boring are in alignment and are developed for guiding the blind rivet through.

4. The fastening assembly according to claim 3, wherein the support plate is arranged on an inner side of the flange of the outer roof side frame.

5. The fastening assembly according to claim 1, wherein the support plate is arranged on an inner side of the flange of the outer roof side frame.

6. The fastening assembly according to claim 1, wherein:
    the outer roof skin element has a roof flange that is connected to the flange of the outer roof side frame, and
    the roof flange has a cutout in an area of the blind rivet.

7. The fastening assembly according to claim 1, wherein:
    the outer roof skin element is made of a different material than the outer roof side frame, and
    the material of the outer roof skin element has a different thermal expansion coefficient than the material of the outer roof side frame.

8. The fastening assembly according to claim 7, wherein the outer roof skin element is made of a light metal material or a fiber composite material and the outer roof side frame is made of a steel material.

9. The fastening assembly according to claim 1, wherein:
    the outer roof side frame together with an inner roof side frame forms a roof side frame hollow profile,
    a flange of the inner roof side frame is connected to the flange of the outer roof side frame, and
    the flange of the inner roof side frame has a cutout in the area of the blind rivet which is at least larger than a bead of the blind rivet.

10. The fastening assembly according to claim 9, wherein the support plate is arranged between the flange of the outer roof side frame and the flange of the inner roof side frame.

11. The fastening assembly according to claim 9, wherein:
    a roof side frame reinforcement is arranged between the outer roof side frame and the inner roof side frame,
    a flange of the roof side frame reinforcement is arranged between the flange of the outer roof side frame and the flange of the inner roof side frame and is connected to the flange of the outer roof side frame and the flange of the inner roof side frame,
    the support plate is arranged between the flange of the outer roof side frame and the flange of the roof side frame reinforcement, and
    the flange of the roof side frame reinforcement has a cutout that is at least larger than the blind rivet bead.

12. The fastening assembly according to claim 1, wherein the support plate is firmly bonded by being glued or welded to the flange of the outer roof side frame.

13. The fastening assembly according to claim 1, wherein the blind rivet is a blind rivet nut.

14. A fastening assembly for a roof add-on part of a motor vehicle, comprising:
    an outer roof skin element;
    a roof side frame, the roof side frame including an inner roof side frame, an outer roof side frame, and a roof side reinforcement disposed therebetween;
    a roof add-on part fastening element having a thread configured to detachably fasten the roof add-on part;
    a blind rivet configured to fix some but not all components; and
    a support plate, wherein
    each of the inner roof side frame, the outer roof side frame, and the roof side reinforcement define a flange portion,
    the roof add-on part fastening element is fastened to the support plate, and
    the blind rivet fixes only the support plate and the flange portion of the outer roof side frame.

* * * * *